United States Patent
Cunha et al.

(10) Patent No.: US 10,443,848 B2
(45) Date of Patent: Oct. 15, 2019

(54) GROMMET ASSEMBLY AND METHOD OF DESIGN

(71) Applicant: United Technologies Corporation, Hartford, CT (US)

(72) Inventors: Frank J. Cunha, Avon, CT (US); Stanislav Kostka, Jr., Middletown, CT (US); Andreas Sadil, Newington, CT (US)

(73) Assignee: United Technologies Corporation, Farmington, CT (US)

( * ) Notice: Subject to any disclaimer, the term of this patent is extended or adjusted under 35 U.S.C. 154(b) by 513 days.

(21) Appl. No.: 14/677,520

(22) Filed: Apr. 2, 2015

(65) Prior Publication Data
US 2015/0285498 A1    Oct. 8, 2015

Related U.S. Application Data

(60) Provisional application No. 61/974,248, filed on Apr. 2, 2014.

(51) Int. Cl.
*F23R 3/06* (2006.01)
*F02C 7/18* (2006.01)
(Continued)

(52) U.S. Cl.
CPC ............... *F23R 3/06* (2013.01); *F02C 7/18* (2013.01); *F23R 3/002* (2013.01); *F23R 3/045* (2013.01);
(Continued)

(58) Field of Classification Search
CPC .... F23R 3/00; F23R 3/06; F23R 3/002; F23R 3/60; F23R 2900/00018;
(Continued)

(56) References Cited

U.S. PATENT DOCUMENTS 2,742,762 A * 4/1956 Kuhring ............... F23R 3/06
60/752
3,545,202 A * 12/1970 Batt .................... F23R 3/08
60/757

(Continued)

FOREIGN PATENT DOCUMENTS

GB    2017827 A  * 10/1979  ............. F23R 3/002
GB    2353589 A  *  2/2001  ............. F23R 3/002

OTHER PUBLICATIONS

EP search report for EP15162484 dated Jul. 28, 2015.

*Primary Examiner* — Alain Chau
(74) *Attorney, Agent, or Firm* — O'Shea Getz P.C.

(57) ABSTRACT

A grommet assembly and method of design to enhance the flow coefficient, thereof, includes a shell having a first side and an opposite second side, and a chamfered grommet projecting through the shell along a centerline and including an annular first end surface spaced outward from the first side and a conical face spanning axially and radially inward from the annular first end surface and axially beyond the second side. The assembly may further include a panel spaced from the shell and defining a cooling cavity therebetween with the conical surface defining at least in-part a hole in fluid communication through the shell and panel and isolated from the cooling cavity. A plurality of cooling channels in the grommet are in fluid communication with the cooling cavity and communicate through the panel. The combination of the conical face and the cooling channels improve the discharge coefficient of the grommet while enhancing grommet cooling.

20 Claims, 4 Drawing Sheets

(51) Int. Cl.
  *F23R 3/00* (2006.01)
  *F23R 3/04* (2006.01)
  *F23R 3/50* (2006.01)

(52) U.S. Cl.
  CPC ...... *F23R 3/50* (2013.01); *F23R 2900/00018* (2013.01); *F23R 2900/03042* (2013.01); *Y02T 50/675* (2013.01); *Y10T 16/05* (2015.01); *Y10T 29/49* (2015.01)

(58) Field of Classification Search
  CPC .. F23R 2900/03042–03045; F23R 3/04; F23R 3/283; F23R 3/045; F23R 3/50; F23R 3/08; Y10T 16/05; Y10T 29/49; Y02T 50/675; F02C 7/18
  See application file for complete search history.

(56) References Cited

U.S. PATENT DOCUMENTS

| | | | | |
|---|---|---|---|---|
| 3,584,888 A * | 6/1971 | Lott | ...................... | H02G 3/0683 174/153 G |
| 4,122,653 A * | 10/1978 | Argereu | ...................... | D01H 7/46 57/112 |
| 4,132,066 A * | 1/1979 | Austin, Jr. | ...................... | F23R 3/06 60/752 |
| 4,622,821 A * | 11/1986 | Madden | ...................... | F23R 3/06 60/755 |
| 4,695,247 A * | 9/1987 | Enzaki | ...................... | F23R 3/06 431/352 |
| 4,875,339 A * | 10/1989 | Rasmussen | ...................... | F23R 3/045 60/757 |
| 4,887,432 A * | 12/1989 | Mumford | ...................... | F23R 3/045 60/759 |
| 6,668,559 B2 * | 12/2003 | Calvez | ...................... | F23R 3/007 60/753 |
| 7,013,634 B2 * | 3/2006 | Pidcock | ...................... | F23R 3/002 60/39.821 |
| 7,101,173 B2 * | 9/2006 | Hernandez | ...................... | F02C 7/266 239/533.12 |
| 7,546,739 B2 * | 6/2009 | Holland | ...................... | F23R 3/06 60/39.821 |
| 9,038,395 B2 * | 5/2015 | Rudrapatna | ...................... | F23R 3/06 60/754 |
| 9,360,215 B2 * | 6/2016 | McKenzie | ...................... | F23R 3/007 |
| 2002/0189260 A1* | 12/2002 | David | ...................... | F23R 3/045 60/746 |
| 2003/0163995 A1* | 9/2003 | White | ...................... | F23R 3/002 60/800 |
| 2004/0104538 A1* | 6/2004 | Pidcock | ...................... | F23R 3/002 277/549 |
| 2010/0122537 A1* | 5/2010 | Yankowich | ...................... | F23R 3/005 60/754 |
| 2012/0102963 A1 | 5/2012 | Corr et al. | | |
| 2013/0255269 A1* | 10/2013 | McKenzie | ...................... | F23R 3/007 60/772 |
| 2014/0250917 A1* | 9/2014 | Garry | ...................... | B22D 25/02 60/806 |
| 2015/0241063 A1* | 8/2015 | Bangerter | ...................... | F23R 3/002 60/754 |
| 2016/0209035 A1* | 7/2016 | Cramer | ...................... | F23R 3/02 |

* cited by examiner

GROMMET ASSEMBLY AND METHOD OF DESIGN

This application claims priority to U.S. Patent Appln. No. 61/974,248 filed Apr. 2, 2014.

BACKGROUND

The present disclosure relates to a grommet assembly and, more particularly, to a dilution air grommet assembly for a combustor and method of design to enhance flow coefficient.

Gas turbine engines, such as those that power modern commercial and military aircraft, include a fan section to propel the aircraft, a compressor section to pressurize a supply of air from the fan section, a combustor section to burn a hydrocarbon fuel in the presence of the pressurized air, and a turbine section to extract energy from the resultant combustion gases and thereby generate thrust.

The combustor section typically includes a wall assembly having an outer shell lined with heat shields that are often referred to as floatwall panels. Together, the panels define a combustion chamber. A plurality of dilution holes are generally spaced circumferentially about the wall assembly and flow dilution air from a cooling plenum and into the combustion chamber to improve emissions, and reduce and control the temperature profile of combustion gases at the combustor outlet to protect the turbine section from overheating.

The dilution holes are generally defined by a grommet that extends between the heat shield panel and supporting shell with a cooling cavity defined therebetween. Enhanced cooling of the grommets is desirable for improved engine efficiency, robustness, and durability.

SUMMARY

A grommet according to one, non-limiting, embodiment of the present disclosure includes a core including a chamfered inlet portion having a chamfered ratio equal to or greater than 0.10.

Additionally to the foregoing embodiment, the chamfered core defines an axial length ratio equal to or greater than 0.25.

In the alternative or additionally thereto, in the foregoing embodiment, the core includes a cylindrical face and a conical face extending outward from the cylindrical face at a peripheral inner edge, and the cylindrical and conical faces define a hole extending along a centerline through the core.

In the alternative or additionally thereto, in the foregoing embodiment, the conical face extends transverse to a reference plane normal to the centerline at an angle of about twenty-five to forty-five degrees.

In the alternative or additionally thereto, in the foregoing embodiment, the conical face is angled from a reference plane disposed normal to the centerline at about thirty degrees.

In the alternative or additionally thereto, in the foregoing embodiment, a hole communicates through the core along a centerline and is defined at least in-part by a conical face spanning axially and radially outward to an annular end surface carried by the core, and the conical face extends transverse to a reference plane normal to the centerline at an angle of about twenty-five to forty-five degrees.

In the alternative or additionally thereto, in the foregoing embodiment, a hole communicates through the core along a centerline, and the core carries and extends between opposite annular first and second end surfaces concentrically disposed to the centerline, and wherein the second end surface is located at least in-part radially inward from the first end surface.

In the alternative or additionally thereto, in the foregoing embodiment, the grommet includes a flange projecting radially outward from the core and spaced axially between the first and second end surfaces.

In the alternative or additionally thereto, in the foregoing embodiment, the flange includes a peripheral face spanning axially and extending circumferentially around the core, and wherein a plurality of cooling channels are circumferentially spaced from one another and each one of the plurality of cooling channels extends between and communicates through the peripheral face and the second end surface.

A grommet assembly according to another, non-limiting, embodiment includes a shell having a first side and an opposite second side; a chamfered core projecting through the shell along a centerline and including an annular first end surface spaced outward from the first side and a conical face spanning axially and radially inward from the annular first end surface and axially beyond the second side; and wherein the conical face defines at least in-part a hole in the core and communicating through the shell.

Additionally the foregoing embodiment, the assembly includes a flange projecting radially outward from the core and spaced axially between the annular first end surface and an opposite, annular, second end surface of the chamfered core.

In the alternative or additionally thereto, in the foregoing embodiment, the flange carries a peripheral face spanning axially and extending circumferentially around the core, and wherein a plurality of cooling channels are circumferentially spaced from one another and each one of the plurality of cooling channels extend between and communicate through the peripheral face and the second end surface.

In the alternative or additionally thereto, in the foregoing embodiment, the assembly includes a panel with a cooling cavity defined between the shell and the panel; and wherein the flange is in the cooling cavity.

In the alternative or additionally thereto, in the foregoing embodiment, the hole is a dilution hole and is in fluid communication between a cooling plenum defined in part by the first side and a combustion chamber defined in-part by the panel.

In the alternative or additionally thereto, in the foregoing embodiment, the chamfered core has a chamfered ratio equal to or greater than 0.10.

In the alternative or additionally thereto, in the foregoing embodiment, the conical face spans axially and radially inward to a cylindrical face defining in-part the hole, and the chamfered core has an axial length ratio equal to or greater than 0.25.

In the alternative or additionally thereto, in the foregoing embodiment, the conical face extends transverse to a reference plane normal to the centerline at an angle of about twenty-five to forty-five degrees.

In the alternative or additionally thereto, in the foregoing embodiment, the conical face is angled from a reference plane disposed normal to the centerline at about thirty degrees.

A method of enhancing a discharge coefficient of a grommet assembly design according to another, non-limiting, embodiment includes the steps of choosing an angle between about twenty-five to forty-five degrees wherein an inlet portion of a core of the assembly includes a conical face defining at least in-part a hole extending along a centerline through the core, and wherein the conical face extends transverse to a reference plane normal to the centerline at the angle; choosing a chamfered ratio of a chamfered inlet portion of a core of the grommet assembly; choosing an axial length ratio of the core; choosing a chart based on the chosen angle; and determining the discharge coefficient from the chart displaying axial length ratio verse chamfered ratio.

Additionally to the foregoing embodiment, the chamfered ratio is equal to or greater than 0.10 and the axial length ratio is equal to or greater than 0.25.

The foregoing features and elements may be combined in various combination without exclusivity, unless expressly indicated otherwise. These features and elements as well as the operation thereof will become more apparent in light of the following description and the accompanying drawings. It should be understood, however, the following description and figures are intended to exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
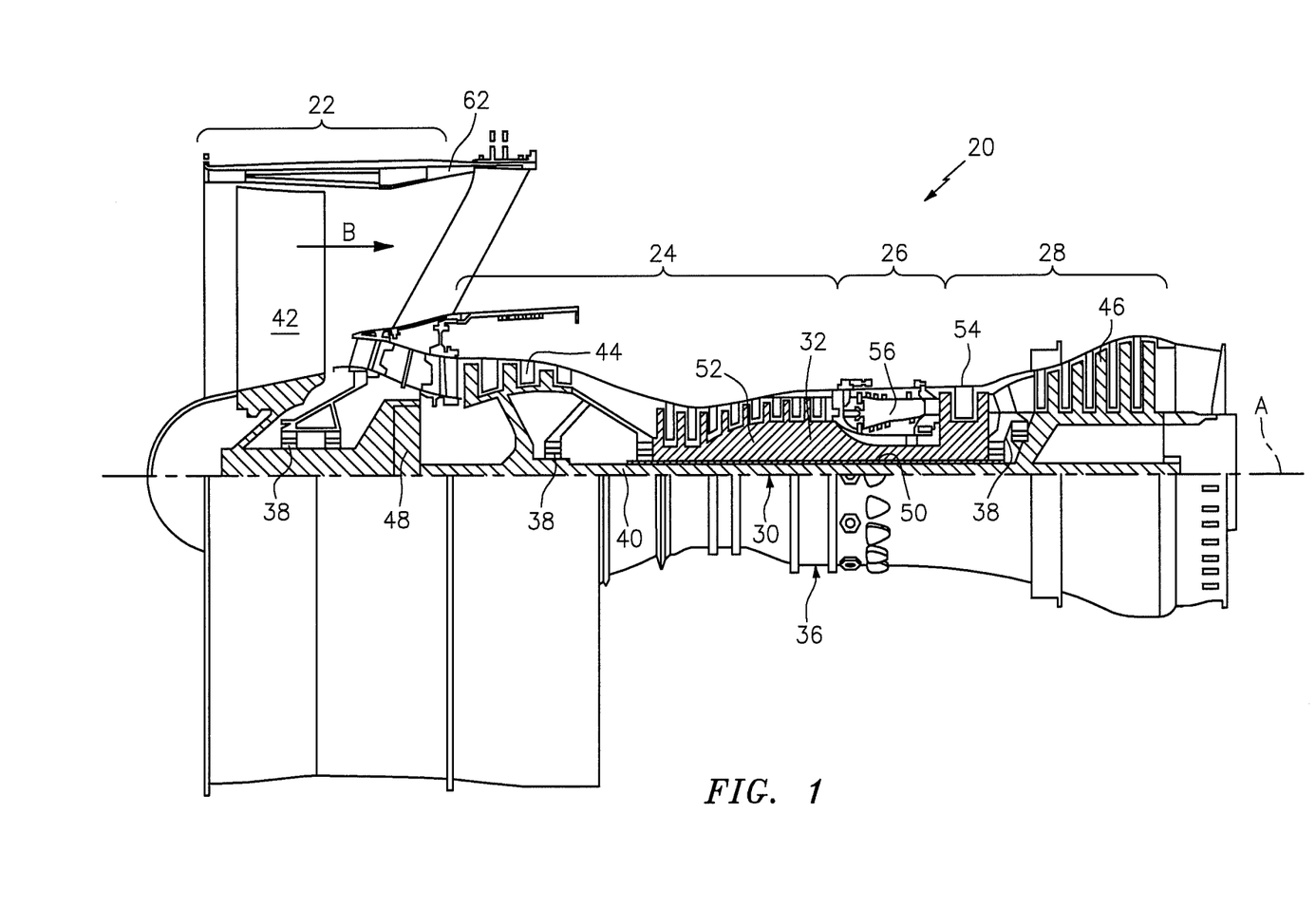
FIG. 1 is a schematic cross-section of a gas turbine engine.

FIG. 1 schematically illustrates a gas turbine engine 20 disclosed as a two-spool turbo fan that generally incorporates a fan section 22, a compressor section 24, a combustor section 26 and a turbine section 28. Alternative engines may include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engine architecture such as turbojets, turboshafts, and three-spool turbofans with an intermediate spool.

The engine 20 generally includes a low spool 30 and a high spool 32 mounted for rotation about an engine axis A via several bearing structures 38 and relative to a static engine case 36. The low spool 30 generally includes an inner shaft 40 that interconnects a fan 42 of the fan section 22, a low pressure compressor 44 ("LPC") of the compressor section 24 and a low pressure turbine 46 ("LPT") of the turbine section 28. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor 52 ("HPC") of the compressor section 24 and a high pressure turbine 54 ("HPT") of the turbine section 28. A combustor 56 of the combustor section 26 is arranged between the HPC 52 and the HPT 54. The inner shaft 40 and the outer shaft 50 are concentric and rotate about the engine axis A. Core airflow is compressed by the LPC 44 then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3:1, and in another example is greater than about 2.5:1. The geared turbofan enables operation of the low spool 30 at higher speeds that can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting example, the bypass ratio of the gas turbine engine 20 is greater than about ten (10:1); the fan diameter is significantly larger than the LPC 44; and the LPT 46 has a pressure ratio that is greater than about five (5:1). It should be understood; however, that the above parameters are only exemplary of one example of a geared architecture engine and that the present disclosure is applicable to other gas turbine engines including direct drive turbofans.

In one non-limiting example, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel consumption (TSFC). TSFC is an industry standard parameter of fuel consumption per unit of thrust.

Fan Pressure Ratio is the pressure ratio across a blade of the fan section 22 without the use of a fan exit guide vane system. The low Fan Pressure Ratio according to one non-limiting example of the gas turbine engine 20 is less than 1.45:1. Low Corrected Fan Tip Speed is the actual fan tip speed divided by an industry standard temperature correction of $(T/518.7^{0.5})$, where "T" represents the ambient temperature in degrees Rankine. The Low Corrected Fan Tip Speed according to one non-limiting example of the gas turbine engine 20 is less than about 1150 fps (351 m/s).

Figure 2:
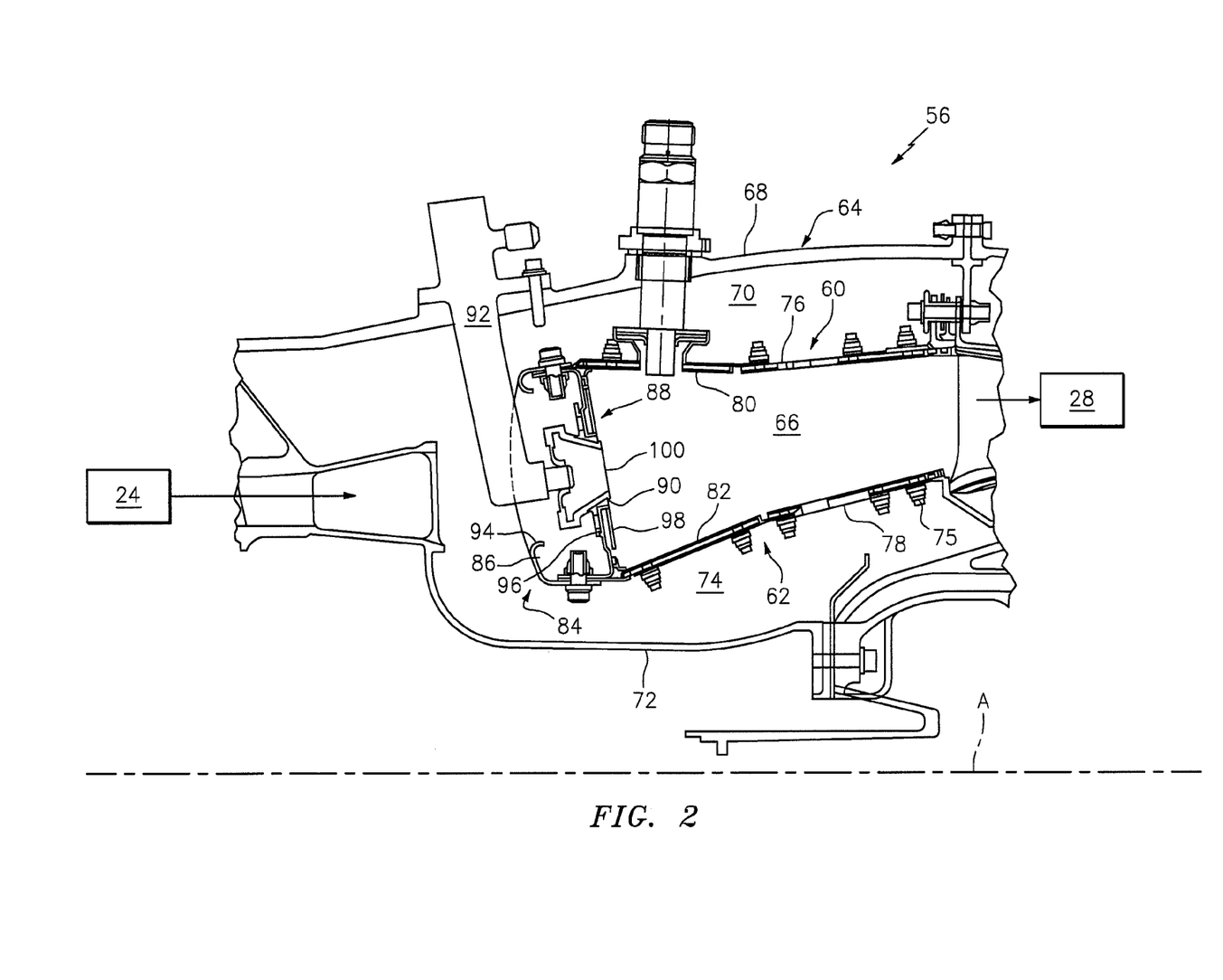
FIG. 2 is a cross-section of a combustor section.

Referring to FIG. 2, the combustor section 26 generally includes an annular combustor 56 with an outer combustor wall assembly 60, an inner combustor wall assembly 62, and a diffuser case module 64 that surrounds assemblies 60, 62. The outer and inner combustor wall assemblies 60, 62 are generally cylindrical and radially spaced apart such that an annular combustion chamber 66 is defined therebetween. The outer combustor wall assembly 60 is spaced radially inward from an outer diffuser case 68 of the diffuser case module 64 to define an outer annular plenum 70. The inner wall assembly 62 is spaced radially outward from an inner diffuser case 72 of the diffuser case module 64 to define, in-part, an inner annular plenum 74. Although a particular combustor is illustrated, it should be understood that other combustor types with various combustor liner arrangements will also benefit. It is further understood that the disclosed cooling flow paths are but an illustrated embodiment and should not be so limited.

The combustion chamber 66 contains the combustion products that flow axially toward the turbine section 28. Each combustor wall assembly 60, 62 generally includes a respective support shell 76, 78 that supports one or more heat shields or liners 80, 82. Each of the liners 80, 82 may be formed of a plurality of floating panels that are generally rectilinear and manufactured of, for example, a nickel based super alloy that may be coated with a ceramic or other temperature resistant material, and are arranged to form a liner configuration mounted to the respective shells 76, 78.

The combustor 56 further includes a forward assembly 84 that receives compressed airflow from the compressor section 24 located immediately upstream. The forward assembly 84 generally includes an annular hood 86, a bulkhead assembly 88, and a plurality of swirlers 90 (one shown). Each of the swirlers 90 are circumferentially aligned with one of a plurality of fuel nozzles 92 (one shown) and a respective hood port 94 to project through the bulkhead assembly 88. The bulkhead assembly 88 includes a bulkhead support shell 96 secured to the combustor wall assemblies 60, 62 and a plurality of circumferentially distributed bulkhead heat shields or panels 98 secured to the bulkhead support shell 96 around each respective swirler 90 opening. The bulkhead support shell 96 is generally annular and the plurality of circumferentially distributed bulkhead panels 98 are segmented, typically one to each fuel nozzle 92 and swirler 90.

The annular hood 86 extends radially between, and is secured to, the forwardmost ends of the combustor wall assemblies 60, 62. Each one of the plurality of circumferentially distributed hood ports 94 receives a respective on the plurality of fuel nozzles 92, and facilitates the direction of compressed air into the forward end of the combustion chamber 66 through a swirler opening 100. Each fuel nozzle 92 may be secured to the diffuser case module 64 and projects through one of the hood ports 94 into the respective swirler 90.

The forward assembly 84 introduces core combustion air into the forward section of the combustion chamber 66 while the remainder of compressor air enters the outer annular plenum 70 and the inner annular plenum 74. The plurality of fuel nozzles 92 and adjacent structure generate a blended fuel-air mixture that supports stable combustion in the combustion chamber 66.

Figure 3:
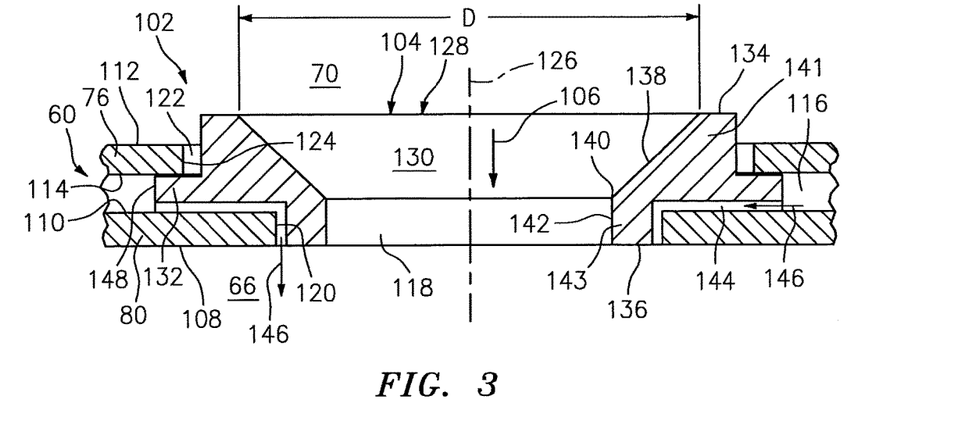
FIG. 3 is a cross section of a grommet assembly according to one non-limiting example of the present disclosure.
Figure 4:
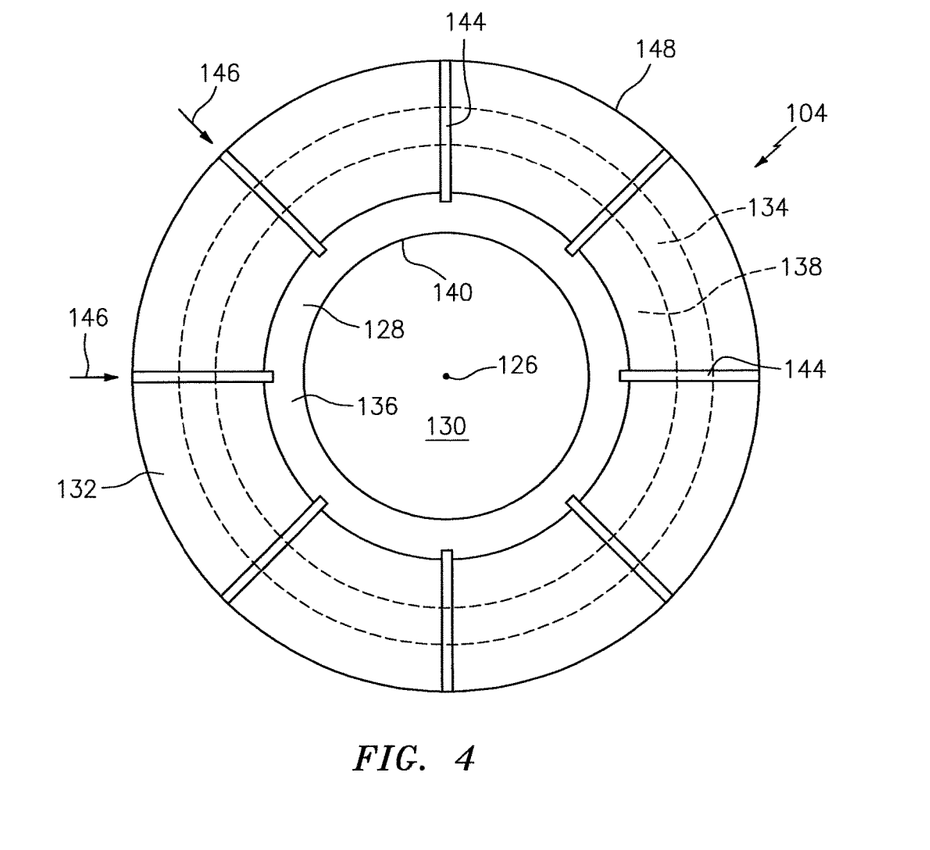
FIG. 4 is a bottom plan view of a grommet of the grommet assembly.

Referring to FIGS. 3 and 4, a dilution hole grommet assembly 102 is illustrated and described in relation to the outer wall assembly 60 for simplicity of explanation; however, it is understood that the same grommet assembly may be applied to the inner wall assembly 62 of the combustor 56. The grommet assembly 102 includes a portion of the support shell 76, a portion of the heat shield or panel 80, and a grommet 104. The grommet assembly 102 generally functions to flow dilution air (see arrow 106) from the cooling plenum 70, through the wall assembly 60, via the grommet 104, and into the combustion chamber 66. This dilution air generally enters the combustion chamber 66 as a jet stream to improve combustion efficiency generally in a core region of the chamber and further serves to cool and/or control the temperature profile of combustion air at the exit of the combustor 56.

The heat resistant panel 80 of wall assembly 60 (which may include an array of panels) includes a hot side 108 that generally defines in-part a boundary of the combustion chamber 66 and an opposite cold side 110. The shell 76 includes an outer side 112 that faces and defines in-part a boundary of the cooling plenum 70 and an opposite inner side 114 that faces and is spaced from the cold side 110 of the heat shield 80. An annular cooling cavity 116 is located between and defined by the cold side 110 of the heat shield 80 and the inner side 114 of the shell 76.

An aperture 118 may communicate through the heat shield 80 and is defined by a circumferentially continuous surface 120 of the heat shield 80 and spanning axially between the hot and cold sides 108, 110. Similarly, an aperture 122 communicates through the shell 76 and is defined by a circumferentially continuous surface 124 of the shell 76 and spanning axially between the outer and inner sides 112, 114. A centerline 126 extends through the apertures 118, 122 and may be substantially normal to the wall assembly 60 and may intersect the engine axis A (FIG. 1).

The grommet 104 of the grommet assembly 102 has a chamfered core 128 that defines a dilution hole 130, and a flange 132 that projects radially outward from the core 128 and into the cooling cavity 116. The core 128, the dilution hole 130 and the flange 132 may all be substantially concentric to the centerline 126. The cooling cavity 116 does not generally communicate directly with the dilution hole 130. Thus, the flange 132 may be in circumferentially continuous sealing contact with the inner side 114 of the shell 76 and may be cast as one piece, brazed, or otherwise adhered to the cold side 110 and/or continuous surface 120 of the panel 80.

The chamfered core 128 extends into the aperture 118 of the panel 80 and through the aperture 122 of the shell 76 and into the cooling plenum 70. More specifically, the core 128 carries opposite annular end surfaces 134, 136, both concentric to the centerline 126, with end surface 134 located in the cooling plenum 70 and spaced outward from the outer side 112 of the shell 76, and with end surface 136 being substantially flush with the hot side 108 of the panel 80. The core 128 further includes a substantially conical face 138, a peripheral inner edge or apex 140, and a substantially cylindrical face 142 that together generally define the dilution hole 130. The conical face 138 extends axially and radially inward from the annular end surface 134 and to the inner edge 140. The cylindrical face 142 extends axially from the inner edge 140 to the end surface 136. Thus, the chamfered core 128 generally includes a chamfered inlet portion 141 having the conical face 138 and a cylindrical outlet portion 143 having the cylindrical face 142.

The grommet 104 further has a plurality of cooling channels 144 spaced circumferentially about the grommet for flowing cooling air from the cooling cavity 116 and into the combustion chamber 66 (see arrow 146) for generally cooling the core 128 of the grommet 104 at and/or near the end surface 136, and which may further enhance penetration of the dilution air jet flow 106 into the combustion chamber 66. Each cooling channel 144 has an inlet generally defined by an outer circumferential, or peripheral, face 148 of the flange 132 and an outlet defined by the annular end surface 136 of the core 128. Each channel 144 thus communicates through the flange 132 and the core 128 providing distributed fluid communication between the cooling cavity 116 and the combustion chamber 66. For ease of manufacturing, each channel 144 may generally be a groove in the grommet 104, and generally defined between the cold side 110 and continuous surface 120 of the panel 80, and the flange 132 and core 128 of the grommet 104.

Figure 5:
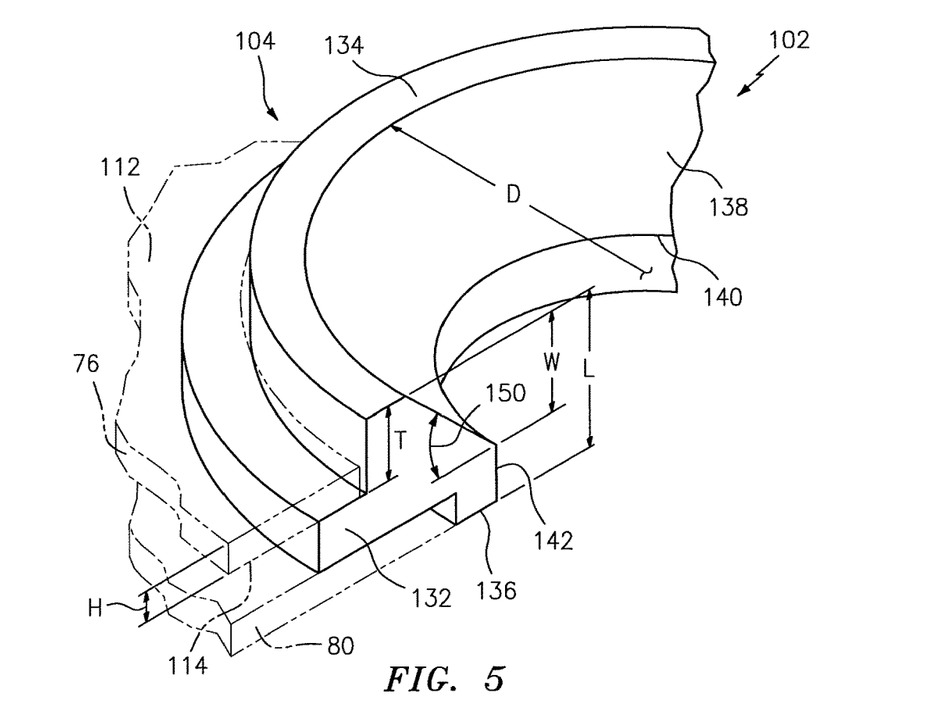
FIG. 5 is a partial perspective view of the grommet assembly.
Figure 6:
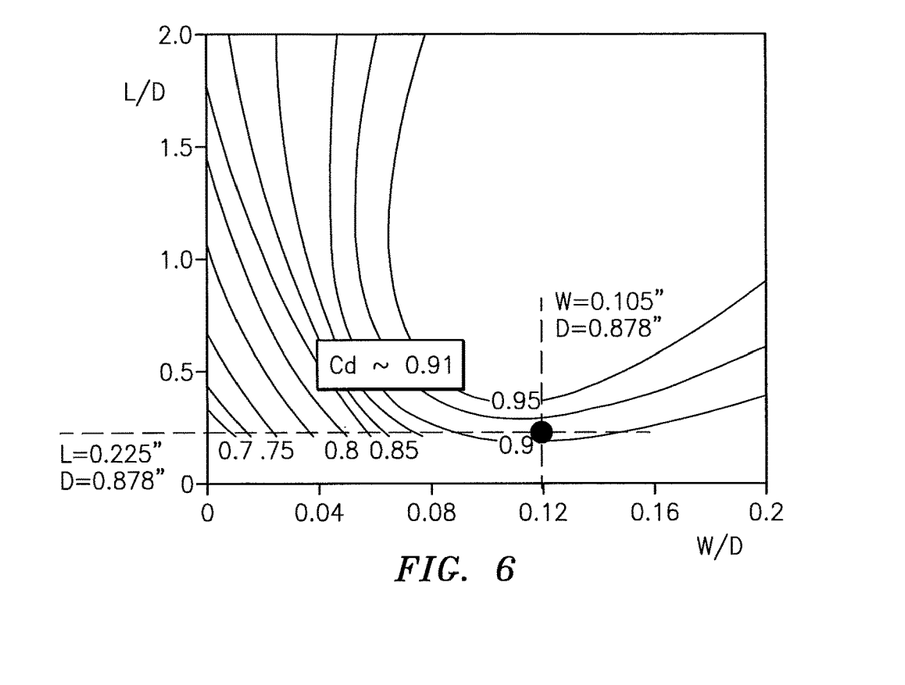
FIG. 6 is a graph of an axial length ratio verse a chamfered ratio to determine a discharge coefficient signified by a plurality of charted, curved, lines.

Referring to FIGS. 5 and 6, more traditional grommet assemblies display low discharge coefficients signifying impaired dilution air jet flow penetration into the core regions of the combustion chamber 66. Such low discharge coefficients may be attributable to hot combustion air recirculation zones at or near the dilution air grommet that may further cause overheating and degradation of the grommet. In accordance with the present disclosure, significant grommet performance and durability improvements (e.g. reduced metal temperatures) can be achieved through use of particular dimensional relationships of the core 128 of the grommet 104 and the cooling channels 144.

These dimensional relationships may generally be as follows:

$$W/D \geq 1/10;\ L/D \geq 1/4;\ W \geq H;\ T \geq H$$

where 'W/D' is a chamfered ratio, 'L/D' is an axial length ratio, 'W' is a distance measured axially (i.e. with respect to centerline 126) between the inner edge 140 and the annular end surface 134, 'D' is an outer diameter of the conical face 138 (i.e. where the conical face 138 meets the end surface 134), 'L' is a distance measured axially between the opposite end surfaces 134, 136, 'H' is the distance measured between the outer and inner sides 112, 114 of the shell 76 (i.e. shell thickness), and 'T' is the distance measured axially between the end surface 134 and the flange 132. These dimensional relationships may be combined with an angle (see arrow 150 in FIG. 5) of the conical surface 138 (measured from a reference plane that is substantially normal to the centerline 126) that falls within a range of twenty-five to forty-five degrees.

As one non-limiting example, a more traditional discharge coefficient (Cd) can be improved from about 0.6 to about 0.9, thereby reducing or eliminating gas recirculation and reducing local metal temperatures from about a melting temperature of the alloy to about a 400 degree Fahrenheit margin below melting temperature when the conical surface angle 150 is about thirty degrees, 'W' is equal to or greater than about three times the panel 80 thickness, 'L' is equal to or greater than about six times the panel thickness, 'D' is equal to or greater than about twenty times the panel thickness, and a hydraulic diameter of the cooling channel 144 (eight illustrated in FIG. 4) is about equal to or greater than 0.5 times the panel thickness. As a more specific, non-limiting, example: 'W' may be about 0.105 inches (2.667 mm), 'L' may be about 0.225 inches (5.715 mm), 'D' may be about 0.878 inches (22.301 mm), and the hydraulic diameter of each cooling channel 144 may be about 0.020 inches (0.508 mm).

Referring further to FIG. 6, a graph illustrates the chamfered ratio 'W/D' verse the axial length ratio with the conical surface angle 150 at about thirty degrees. Empirical data further depicts discharge coefficient values (i.e. 0.7 through 0.95) as a function of the chamfered ratio versus axial length ratio. That is, each discharge coefficient value is represented by a charted, curved, line gathered empirically. Generally, with increasing chamfered and axial length ratios, the discharge coefficient value also increases. Therefore, with predetermined chamfered and axial length ratios, one can determine the discharge coefficient value when the conical surface angle 150 is thirty degrees.

It is understood that relative positional terms such as "forward," "aft," "upper," "lower," "above," "below," and the like are with reference to the normal operational attitude and should not be considered otherwise limiting. It is also understood that like reference numerals identify corresponding or similar elements throughout the several drawings. It should be understood that although a particular component arrangement is disclosed in the illustrated embodiment, other arrangements will also benefit. Although particular step sequences may be shown, described, and claimed, it is understood that steps may be performed in any order, separated or combined unless otherwise indicated and will still benefit from the present disclosure.

The foregoing description is exemplary rather than defined by the limitations described. Various non-limiting embodiments are disclosed; however, one of ordinary skill in the art would recognize that various modifications and variations in light of the above teachings will fall within the scope of the appended claims. It is therefore understood that within the scope of the appended claims, the disclosure may be practiced other than as specifically described. For this reason, the appended claims should be studied to determine true scope and content.

What is claimed is:

1. A grommet for a gas turbine engine combustor, comprising:
   a core including a chamfered inlet portion having a chamfered ratio equal to 0.10 or 0.20 or between 0.10 and 0.20;
   wherein a hole communicates through the core along a centerline and is defined at least in-part by a conical face spanning axially and radially outward to an annular end surface carried by the core, and the conical face extends transverse to a reference plane normal to the centerline at an angle;
   wherein the chamfered ratio is calculated as W/D, W is a distance measured axially between an inner edge of the conical face and the annular end surface, and D is an outer diameter of the conical face where the conical face meets the annular end surface;
   a plurality of cooling channels circumferentially spaced from one another about the centerline, each cooling channel of the plurality of cooling channels configured with a radial portion and an axial portion, the radial portion extending radially relative to the centerline in the core, the axial portion extending axially relative to the centerline in the core, and the axial portion extending circumferentially relative to the centerline between opposing channel surfaces of the core; and
   a flange projecting radially outward from the core, wherein the radial portion is formed as a groove on the flange and extends in a radial direction towards the core, and wherein the axial portion is formed as a groove on the core and extends in an axial direction away from the flange.

2. The grommet set forth in claim 1, wherein
   the core defines an axial length ratio equal to 0.25 or 0.9 or between 0.25 and 0.9;
   the axial length ratio is calculated as L/D; and
   L is a distance measured axially between the annular end surface and an opposite second end surface (136).

3. The grommet set forth in claim 2, wherein the axial length ratio is equal to 0.25.

4. The grommet set forth in claim 2, wherein the core includes a cylindrical face and the conical face extends outward from the cylindrical face at a peripheral inner edge, and the cylindrical and conical faces define the hole.

5. The grommet set forth in claim 4, wherein the angle is between twenty-five and forty-five degrees.

6. The grommet set forth in claim 4, wherein the angle is thirty degrees.

7. The grommet set forth in claim 1, wherein the angle is thirty degrees.

8. The grommet set forth in claim 1, wherein the core carries an annular second end surface that is opposite and concentric with the annular end surface, the core extends between the annular end surface and the annular second end surface, and the annular second end surface is located at least in-part radially inward from the annular end surface.

9. The grommet set forth in claim 8, wherein the flange is spaced axially between the annular end surface and the annular second end surface.

10. The grommet set forth in claim 9, wherein the flange includes a peripheral face spanning axially and extending circumferentially around the core, each cooling channel of the plurality of cooling channels extends between and communicates through the peripheral face and the annular second end surface, the radial portion is adjacent the peripheral face, and the axial portion is adjacent the annular second end surface.

11. A grommet assembly for a gas turbine engine combustor, comprising:
a shell having a first side and an opposite second side;
a chamfered core projecting through the shell along a centerline and including an annular first end surface spaced outward from the first side and a conical face spanning axially and radially inward from the annular first end surface and axially beyond the second side; and
wherein the conical face defines at least in-part a hole in the core and communicating through the shell; and
wherein the conical face is angled from a reference plane disposed normal to the centerline at thirty degrees; and
a plurality of cooling channels extending within the chamfered core and circumferentially spaced from one another about the centerline, a first of the plurality of cooling channels having an L-shaped configuration, a second of the plurality of cooling channels having an L-shaped configuration, and the first of the plurality of cooling channels fluidly discrete from the second of the plurality of cooling channels, and
a flange projecting radially outward from the chamfered core, wherein a radial portion of each cooling channel of the plurality of cooling channels is formed as a groove on the flange and extends in a radial direction towards the chamfered core, and wherein an axial portion of each cooling channel of the plurality of cooling channels is formed as a groove on the chamfered core and extends in an axial direction away from the flange.

12. The grommet assembly set forth in claim 11, wherein the flange is spaced axially between the annular first end surface and an opposite, annular, second end surface of the chamfered core.

13. The grommet assembly set forth in claim 12, wherein the flange carries a peripheral face spanning axially and extending circumferentially around the core, and each cooling channel of the plurality of cooling channels extends between and communicate through the peripheral face and the second end surface.

14. The grommet assembly set forth in claim 13 further comprising:
a panel with a cooling cavity defined between the shell and the panel; and
wherein the flange is in the cooling cavity.

15. The grommet assembly set forth in claim 14, wherein the hole is a dilution hole and is in fluid communication between a cooling plenum defined in part by the first side and a combustion chamber defined in-part by the panel.

16. The grommet assembly set forth in claim 12, wherein the conical face spans axially and radially inward to a cylindrical face defining in-part the hole, and the chamfered core has an axial length ratio equal to 0.25.

17. The grommet assembly set forth in claim 12, wherein the chamfered core has a chamfered ratio equal to 0.10 or 0.20 or between 0.10 and 0.20.

18. The grommet assembly set forth in claim 12, wherein the conical face spans axially and radially inward to a cylindrical face defining in-part the hole, and the chamfered core has an axial length ratio equal to 0.25 or 0.9 or between 0.25 and 0.9.

19. An assembly for a gas turbine engine combustor, comprising:
a shell configured with a first side and a second side opposite the first side;
a heat shield attached to the shell, wherein a cooling cavity extends between the shell and the heat shield;
a chamfered core projecting through the shell and into the heat shield along a centerline, the chamfered core including an annular first end surface and a conical face, the annular first end surface spaced outward from the first side, the conical face spanning axially and radially inward from the annular first end surface and axially beyond the second side, the conical face at least partially defining a hole in the chamfered core and communicating through the shell;
a flange projecting radially outward from the chamfered core;
a plurality of cooling channels extending within the chamfered core and circumferentially spaced from one another about the centerline;
a first of the plurality of cooling channels having an L-shaped configuration that extends between a first inlet orifice and a first outlet orifice, the first inlet orifice adjacent and fluidly coupled with the cooling cavity, and the first outlet orifice adjacent and fluidly coupled with a combustion chamber, wherein a first radial portion of the first of the plurality of cooling channels is formed as a first groove on the flange and extends in a first radial direction towards the chamfered core, and wherein a first axial portion of the first of the plurality of cooling channels is formed as a first groove on the chamfered core and extends in a first axial direction away from the flange; and
a second of the plurality of cooling channels having an L-shaped configuration that extends between a second inlet orifice and a second outlet orifice, the second inlet orifice adjacent and fluidly coupled with the cooling cavity, and the second outlet orifice adjacent and fluidly coupled with the combustion chamber, wherein a second radial portion of the second of the plurality of cooling channels is formed as a second groove on the flange and extends in a second radial direction towards the chamfered core, and wherein a second axial portion of the second of the plurality of cooling channels is formed as a second groove on the chamfered core and extends in a second axial direction away from the flange.

20. The assembly of claim 19, wherein the conical face is angled from a reference plane disposed normal to the centerline at thirty degrees.

* * * * *